United States Patent Office 3,533,941
Patented Oct. 13, 1970

3,533,941
OIL BASE DRILLING FLUID
John W. Freeland, 819 W. Fern Drive,
Fullerton, Calif. 92632
No Drawing. Filed May 23, 1967, Ser. No. 640,556
Int. Cl. C10m 1/12, 1/16, 1/24
U.S. Cl. 252—8.5        7 Claims

ABSTRACT OF THE DISCLOSURE

The invention provides an oil base drilling fluid, as used in drilling oil and gas wells, which is free from any tendency to thicken under conditions of high temperature. It is compounded from a liquid petroleum oil; a minor fraction by volume of water; a soap thickening agent characterized by being a magnesium or calcium soap of refined tall oil fatty acids; a minor amount of asphalt, which may be added as such or provided by the oil selected; a minor amount of slaked lime; gypsum; and a varying amount of weighting material.

---

This invention relates to oil base drilling fluids, more particularly, of the soap-thickened type and containing asphalt.

Drilling fluids used in drilling oil and gas wells by the rotary process may have a liquid base which is water, or a liquid base which is oil. This invention relates to the latter and includes, as is common in the art, a minor proportion of water present in the oil as an emulsion of the water-in-oil type.

Drilling fluids of the type concerned require a thickening agent to give proper rheological properties to the fluid; they require an additive which reduces the fluid loss of the drilling fluid upon filtration; and in most cases, they require a weighting material to increase the specific gravity of the fluid. The manner of employment of such fluids and the requirements outlined above are well known in the art and need not be described in greater detail. A prime requirement, however, is that these desirable properties must be present not only in the drilling fluid when compounded and first put into use, but must also remain within proper limits during continued usage of the drilling fluid, and particularly when the drilling is under conditions of high bottom-hole temperature.

Of the several thickeners available, soaps are well known and widely used. Again, of the materials used to impart low filtration behavior, asphalt is widely employed. A widely used soap because of its low cost and ready availability is tall oil soap. Where an oil base fluid is concerned, as here, the soap is naturally of a water insoluble type, such as calcium or magnesium. Now it turns out that when an ordinary tall oil soap is used in the presence of asphalt in an oil base drilling fluid, then under drilling conditions wherein the mud is subjected to prolonged high temperatures, the mud thickens, often to a point where it is no longer useable.

An object of the present invention is to provide a novel base drilling fluid employing both tall oil soap and asphalt, which is not subject to high-temperature thickening during use.

Other advantages of the invention will appear as the description thereof proceeds.

Generally speaking and in accordance with illustrative embodiments of my invention, I combine, per barrel of drilling fluid, exclusive of the volume of any weighting material included, from about 5 to about 20 pounds of a soap selected from the class which consists of the magnesium and calcium soaps of refined tall oil fatty acids; from about 30 to about 70 pounds of asphalt; from about 3 to about 8 pounds of dead-burned gypsum; from about 6 to about 15 pounds of slaked lime; and from 0 to about 600 pounds of a powdered weighting material. As the fluid base I use a liquid petroleum oil together with about 1 percent to about 40 percent by volume of water, which becomes emulsified into the oil in the course of compounding the drilling fluid.

Refined tall oil fatty acids are articles of commerce, and are obtained by distilling tall oil fatty acids so that not more than 5 percent by weight consists of rosin acids. Refined tall oil fatty acids, as the term is commercially understood, and defined herein and used in the claims which follow, corresponds to the following analysis, given in parts by weight:

| | Percent |
|---|---|
| Oleic acid | 40–55 |
| Linoleic acid | 33–42 |
| Conjugated linoleic acid | 4–11 |
| Saturated fatty acids | 0.2–6 |
| Rosin acids | ≯5 |

In the case of tall oil fatty acids which are not refined the content of rosin acids is much higher, and varies from about ⅓ to ⅔ of the total organic acids present. The calcium or magnesium soap of the refined tall oil fatty acids may be made in any of the conventional fashions, including for example those set forth in the book: "The Alkaline-Earth and Heavy-Metal Soaps" by S. B. Elliot, New York, 1946. I may also use the calcium and/or magnesium soap made in accordance with the process described and claimed in my copending application, Ser. No. 429,676, filed Feb. 1, 1965, now Pat. No. 3,376,327. However, the knowledge of the contents of that application is not necessary for the practice of the present invention, for as mentioned, soaps made in conventional and well-known fashions work very well indeed. The soap may be made in situ in the process of compounding the drilling fluids by adding the refined tall oil fatty acids and the proper amount of calcium oxide, calcium hydroxide, magnesium oxide, or mixtures thereof, and permitting the soap-forming reaction to take place, which it does within a very short time under normal agitation.

The asphalt may be either straight-run or blown. Straight-run asphalt is a well-known commodity and is obtained as a residual in the processing of crude oil having an asphaltic base. It is not necessary to add straight-run asphalt to the mixture as such, but it may be present as a portion of the petroleum oil used. The latter would be the case, for example, when bunker fuel oil of an asphaltic type is employed, in whole or port, as the oil phase. The amount of asphalt contained in any such oil can readily be determined by standard tests, such as A.S.T.M. Test D–243–36; or by the Institute of Petroleum (London) Test No. IP–143/56. Blown asphalt is likewise a well-known commodity, and may have a melting point in the range of 240° F. to 325° F., although higher and lower melting types are usable in my invention.

The dead-burned gypsum and slaked lime are commercial grades. Slaked lime is, of course, calcium hydroxide and this recitation refers to its state in the composition. Calcium oxide, that is, quick lime, may be used; in which case, slaking to calcium hydroxide will take place promptly when the quick lime contacts the water in my inventive composition.

The weighting material is any of the conventional types, the most common of which is ground barite of a fineness of 95 percent, passing 325 mesh, with a density from about 4.2 to about 4.4

The oil may be any liquid petroleum oil, although considerations of cost generally narrow the choice to diesel oil, gas oil, bunker fuel oil, and various topped crude oils, particularly those available in the locality of the drilling operation. If an oil substantially free of asphalt components is selected, such as diesel oil, then all of the asphalt requirements of the invention must be supplied by extraneously added asphalt. Where bunker fuel oil high in asphalt content, such as occurs for example in California, is used, then this will generally require cutting back with diesel fuel or gas oil so as to bring the overall asphalt content to within the range specified.

The several components of my inventive fluid are brought together under conditions of agitation to form a homogeneous drilling fluid using conventional mixing equipment which need not be described in detail.

I now give some examples, by way of example and not by way of limitation, showing some ways in which the invention may be practiced:

EXAMPLE I

To a mud pit was added 0.3 barrel (of 42 gallons) of bunker fuel oil and 0.6 barrel of diesel oil. The mixed liquid had a Marsh funnel viscosity at 100° F. of 43 seconds, and assayed 55 pounds per barrel of asphalt by A.S.T.M. Test D-243-36. There was then added to the pit 0.1 barrel of water followed by 10 pounds of minus 100 mesh dead-burned gypsum, and 10.5 pounds of refined tall oil fatty acids having a content of rosin acids of 0.9 percent, an acid number of 195, a saponification number of 197, an iodine value of 128, and containing 97.6 percent of fatty acids. The density of the tall oil in pounds per gallon as measured at 25° C. was 7.48 pounds and the titre was 6° C. Also added to the mud pit was 4.7 pounds of calcium oxide, and 450 pounds of barite of density 4.3 and minus 325 mesh, which weighted the drilling mud to a density of 16 pounds per gallon. The entire mixture was agitated for about 8 hours during which time the tall oil acids reacted with the calcium oxide to form a calcium tallate soap. A homogeneous drilling mud was obtained which had an A.P.I. fluid loss of 0.2 cc. in 1.5 hours, at 100 pounds per square inch at a temperature of 195° F. It had a Marsh funnel viscosity at 120° F. of 78 seconds.

After storage of the drilling mud for 4 days at room temperature, it was again tested and found to have a fluid loss of 0.5 cc. in 1.5 hours. Its Marsh funnel viscosity at 120° F. was unchanged.

The mud was then pumped through a centrifugal pump rotating at 2200 r.p.m. at a mud temperateure of about 160 to 190° F. The mud was pumped for 3.5 hours and the pump was then shut down for 64 hours after which the drilling mud was pumped for an additional 8 hours, at the high temperature. During the entire pumping operation, the mud remained essentially unchanged and did not thicken.

EXAMPLE II

Example I was repeated employing 10.5 pounds of natural unrefined tall oil fatty acids in lieu of the refined tall oil fatty acids. About two-fifth of the acid mixture used consisted of rosin acids. After the in situ reaction with the calcium oxide to give a substantially homogeneous drilling mud, the initial Marsh funnel viscosity of the drilling mud at 120° F. was found to be 138 seconds. The fluid loss at 195° F. and 100 p.s.i. was 0.5 cc. over a period of 1.5 hours.

The mud was then pumped through a centrifugal pump rotating at 2200 r.p.m. at a temperature of 160° to 190° F. After 3 hours the mud thickened to such an extent that it could no longer be pumped.

As shown by Examples I and II, the drilling mud of the invention (Example I) was stable to the high shear conditions imposed by prolonged pumping at a high temperature. In contrast, the drilling mud of Example II which was not prepared by employing refined tall oil fatty acids according to the invention, became so thick after 3 hours of pumping that it could no longer be pumped.

EXAMPLE III

Example I was again repeated employing 10.5 pounds of a different grade of refined tall oil fatty acids, having an acid number of 192, a saponification number of 194, an iodine value of 133, 4.5 percent of rosin acids, 93 percent of fatty acids, a density of 7.54 pounds per gallon at 25° C., and a titre of 4° C. All other ingredients and conditions were the same. After completing the formation of the calcium tallate soaps in situ and obtaining a substantially homogeneous drilling mud, the resulting mud was pumped for 8 hours through a centrifugal pump rotating at 2200 r.p.m. at a temperature of 160 to 190° F., the pump was shut down for 51 hours, the mud was again pumped under these conditions for 7 hours, the pump was off for 17 hours, the mud was pumped again for 7 hours, the pump was off for 17 hours, and the mud was further pumped for an additional 2 hours under the same conditions. After this extensive pumping under conditions of high shear and heat, the drilling mud maintained its stability and no thickening of the mud was observed.

EXAMPLE IV

A magnesium tallate soap was formed using the general reaction conditions set forth in my copending application, Ser. No. 429,676. In the course of this reaction, magnesium hydroxide was reacted with the refined tall oil fatty acids of Example I to form a dry soap. A drilling fluid additive was then formed by mixing 10 parts of this magnesium tallate soap with 17.5 parts of ground asphalt having a melting point of 270° F. A portion of the drilling fluid additive containing 10 pounds of magnesium tallate soaps and 17.5 pounds of the ground asphalt was then added to a mud pit along with 10 pounds of slaked lime, 0.3 barrel of water, and 0.7 barrel of a diesel oil of 41° A.P.I. gravity. The ground asphalt was of the blown variety.

After mixing the ingredients to obtain a substantially homogeneous mud, the fluid loss of the mud was found to be 0.5 cc. in 2 hours under a pressure of 100 p.s.i. at room temperature. The resulting mud had good stability to the shear conditions encountered in high pressure pumping.

As shown by the foregoing examples, my invention provides novel drilling muds which have greatly improved stability to the high shear, heat and pressure encountered in the drilling of deep oil wells. In contrast, drilling muds which were not prepared according to the invention did not possess such stability and broke down when subjected to high shear forces. The breakdown of the drilling muds tested was indicated by a great increase in viscosity such that they were no longer capable of being pumped.

While I have described my invention with the aid of numerous examples, it will be apparent that variations are possible in composition, relative proportions, processing times and temperatures, and the like, all within the scope of the invention, as disclosed and set forth in the claims which follow.

Having described my invention, I claim:

1. An oil base drilling fluid consisting essentially of:
   from about 5 to about 20 pounds per barrel of a soap selected from the class which consists of the magnesium and calcium soaps of refined tall oil fatty acids having an analysis as follows:

|  | Percent |
   | --- | --- |
   | Oleic acid | 40–55 |
   | Linoleic acid | 33–42 |
   | Conjugated linoleic acid | 4–11 |
   | Saturated fatty acids | 0.2–6 |
   | Rosin acid | ≯5 | from about 30 to about 70 pounds per barrel of asphalt;
   from about 3 to about 8 pounds per barrel of dead-burned gypsum;

from about 6 to about 15 pounds per barrel of slaked lime;

from about 10 percent to about 40 percent by volume of water;

the remainder being a liquid petroleum oil; and from 0 to about 600 pounds per barrel of a pulverulent weighting material, said pounds of weighting material being calculated on the volume of the aforesaid ingredients excluding said weighting material.

2. A fluid in accordance with claim 1 wherein said petroleum oil is diesel oil.

3. A fluid in accordance with claim 1 wherein said asphalt is furnished by at least a portion of said petroleum oil.

4. A fluid in accordance with claim 1 wherein said asphalt is straight-run asphalt.

5. A fluid in accordance with claim 1 wherein said asphalt is blown asphalt.

6. A fluid in accordance with claim 5 wherein said blown asphalt has a melting point in the range 240° F. to 325° F.

7. A fluid in accordance with claim 1 wherein said weighting material is barite.

References Cited

UNITED STATES PATENTS

| | | | |
|---|---|---|---|
| 2,223,027 | 11/1940 | Dawson et al. | 252—8.5 |
| 2,350,154 | 5/1944 | Dawson et al. | 252—8.5 |
| 2,754,265 | 7/1956 | Hoeppel | 252—8.5 |
| 2,997,441 | 8/1961 | Freeland | 252—8.55 |
| 3,021,277 | 2/1962 | Hoeppel | 252—8.5 |

FOREIGN PATENTS 1,041,730   9/1965   Great Britain.

OTHER REFERENCES

Rogers: Composition and Properties of Oil Well Drilling Fluids, second edition, published 1953 by Gulf Pub. Co. of Houston, Tex., pp. 462, 464, 465, 470 and 471.

HERBERT B. GUYNN, Primary Examiner